March 3, 1970  R. M. HULLE ET AL  3,498,146
GYRO ERECTION SYSTEM
Filed Nov. 21, 1966  2 Sheets-Sheet 1
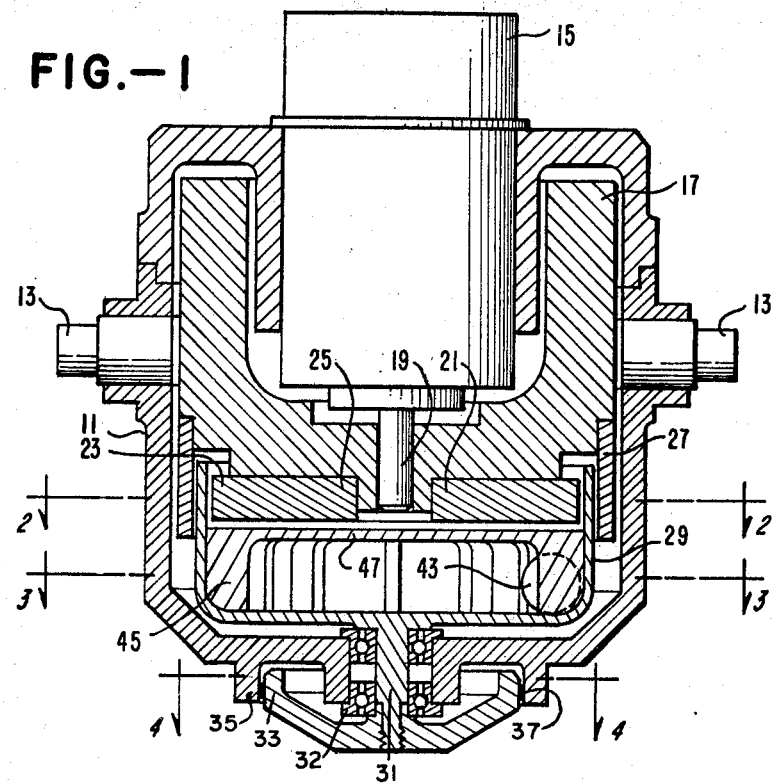
FIG.—1
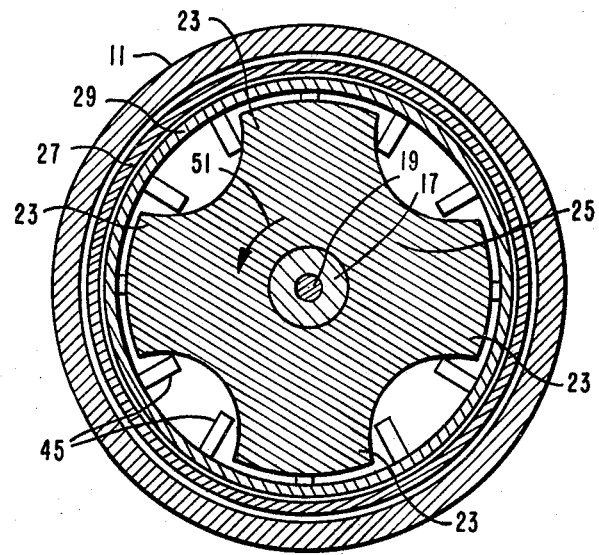
FIG.—2
INVENTORS
FELIX M. DUNKEL
ROBERT M. HULLE
BY Fraser and Bogucki
ATTORNEYS March 3, 1970 R. M. HULLE ET AL 3,498,146
GYRO ERECTION SYSTEM
Filed Nov. 21, 1966 2 Sheets-Sheet 2
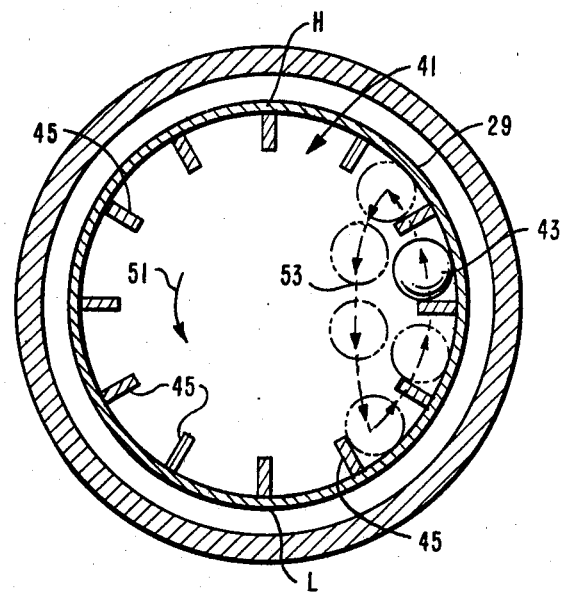
FIG.—3
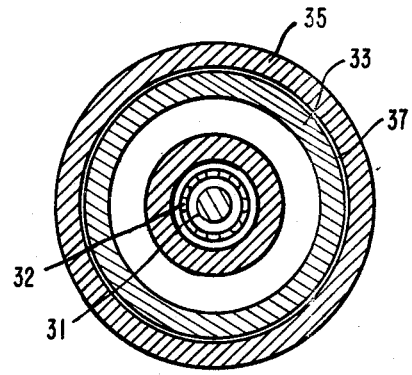
FIG.—4
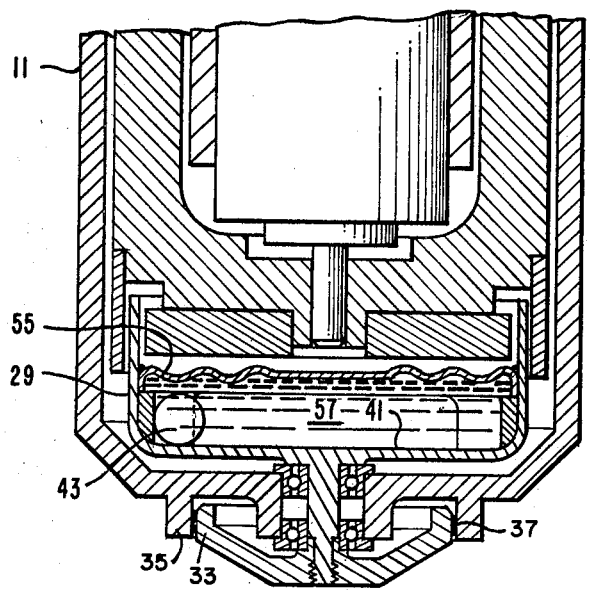
FIG.—5
INVENTORS
FELIX M. DUNKEL
ROBERT M. HULLE
BY *Fraser and Bogucki*
ATTORNEYS United States Patent Office 3,498,146
Patented Mar. 3, 1970

3,498,146
GYRO ERECTION SYSTEM
Robert M. Hulle, Hidden Hills, and Felix M. Dunkel, Thousand Oaks, Calif., assignors to Whittaker Corporation, Los Angeles, Calif., a corporation of California
Filed Nov. 21, 1966, Ser. No. 595,863
Int. Cl. G01c 19/30, 19/46
U.S. Cl. 74—5.44                                  9 Claims

ABSTRACT OF THE DISCLOSURE

A gyroscope with a ball type erecting mechanism. A metallic container containing the erecting balls is mounted for rotation on an axis coincident with the spin axis of the gyro rotor. The container is driven by an eddy current type arrangement wherein permanent magnets integral with the gyro rotor are mounted in a closely spaced relation to the container whereby the ball erecting container is driven at a much less speed than the rotor speed.

---

This invention relates to an improved gyro erection system, and more particularly to an improved system for erecting a gyroscope wherein one or more free rolling masses are used within a continuously rotated container to produce an erecting torque in quadrature with the direction of gyro tilt.

Gyroscope erection systems employing free rolling masses for generating erecting torques are generally referred to in the art as ball-type erection systems. These systems are relatively simple and are frequently preferred over more erratic and complicated air and magnetic type erectors. In such systems, when the gyro axis is tilted, the free rolling ball moves toward the low side of a container which is attached to tilt with the gyro. However, if the weight of the ball remains on the low side of the container, it produces a torque causing the gyro axis to follow a circuitous erecting path roughly describing the locus of a spiral, thus requiring a relatively long time for erection. Ideally, the gyroscope should be erected in a direct path by the application of an erecting torque in quadrature with the gyro tilt. This can be accomplished with ball-type erection systems in which the container for the container for the balls is rotated in the same direction as the gyro, but at a much slower speed, and has ball detaining members about the container periphery. When the gyro tilts, thus tilting the rotating container, the balls roll to the low side where they are engaged by the detaining members and transported toward the high side by the container rotation. As the balls reach the high side of the container, they roll free of the detaining members to roll again toward the low side. The arc through which the balls are transported by the detaining member is roughly centered 90° from the direction of tilt so that the average resulting torque produced by each ball is in quadrature relation to the direction of tilt to cause erection of the gyro in a direct path.

In prior systems of this type, the container was rotated using a reduction gear arrangement for driving the container directly from the gyro rotor. However, most gyroscopes have very high rotor speeds, thus necessitating relatively complex and expensive reduction gearing to achieve the desired speed reduction for rotating the ball container. Also, where the gear member on the gyro rotor engages the adjacent gear, an unbalanced torque is produced tending to cause a constant slight precession about the desired rotational axis.

In addition, most gyroscope erection systems, particularly of the ball type, are generally incapable of operating in a severe vibrational environment, such as is encountered in most helicopters. With ball-type erection systems using a rotating container, a ball is easily dislodged from the peripheral detaining members by vibration so that the desired quadrature torque cannot be achieved.

Therefore, it is an object of the present invention to provide an improved ball-type gyro erection system for applying an erection torque in quadrature relation to the direction of tilt.

Another object of the present invention is to provide a ball-type erection systems wherein a rotating container with ball detaining members about its periphery is driven at a constant slow speed by the gyroscope rotor without employing a reduction gear arrangement in contact with the rotor.

A further object of the present invention is to provide a simple, inexpensive gyroscope erection system for erecting the gyro along a direct path.

Yet another object of the present invention is to provide a ball-type gyroscope erection system capable of operating under severe vibrational conditions.

These and other objects are accomplished in accordance with the invention by providing a ball-type erection system wherein a magnetic armature attached for rotation with the gyroscope rotor is rotated adjacent a metallic cup-shaped container having one or more free rolling balls therein. The metallic cup-shaped container is provided with detaining members about its periphery for transporting the balls from the low to the high side when the container is tilted and is independently mounted for rotation about rotational axis of the gyroscope rotor at a relatively low speed.

In accordance with one particular aspect of the invention, the cup-shaped container is coupled for rotation with a drag member which limits the rotational speed of the container to the desired low level. Movement of the magnetic member generates eddy currents in the metallic container that cause it to rotate in the direction of the gyro rotor, but at a much slower speed, due to the drag force exerted on the drag member by a damping fluid. When the axis of the gyroscope is tilted from the vertical, the force of gravity causes the ball to roll toward the periphery at the low point of the cup-shaped container, where it is engaged by the detaining members and thereupon carried at the periphery through a predetermined arc of rotation centered 90° from the direction of tilt. The average value of the resulting torque on the gyroscope is thus effectively applied at a point in quadrature with the direction of tilt to erect the gyroscope quickly in a direct path. When the gyro is properly erected, the ball rotates continuously to have the same torquing effect in all quadrants, so that the time average of the net torque in any direction is zero. Accordingly, a simple and relatively inexpensive system is provided for erecting the gyro quickly in a direct path to a desired operating alignment.

In the preferred embodiments, the drag force opposing the container rotation is provided by a damping disk that is coupled for rotation with the container within a surrounding sleeve, a high viscosity damping fluid being held by capillary action within a narrow annular space, even under severe vibration, between the damping disk and the inner surface of the sleeve. The drag force restraining rotation of the damping disk, and thus the container, results from a liquid shearing effect caused by the movement of the two closely spaced surfaces on either side of the thin layer of high viscosity damping fluid.

In accordance with other aspects of this invention, an alternative embodiment of the invention enables operation of the ball-type erection systems even under severe vibrational environments. In this embodiment, the ball container is filled with damping fluid in which the ball is completely immersed, and which is confined at the bottom of the container by a flexible cover member.

These and other aspects of the invention are best understood by reference to the following detailed description taken in conjunction with the accompanying drawings, in which:

FIG. 1 is a full sectional plan view of one preferred embodiment of an improved gyroscope system in accordance with this invention;

FIG. 2 is a top cross-sectional view taken along the line 2—2 of FIG. 1;

FIG. 3 is a top view of the cup-shaped container illustrated in FIGS. 1 and 2 showing the distribution and path of the balls with the gyro axis tilted;

FIG. 4 is a top view taken along the line 4—4 of FIG. 1 showing the drag member; and FIG. 5 is a full sectional plan view of an alternative embodiment of a gyroscope system in accordance with the invention for use in vibrational environments.

Referring now to FIG. 1, a gyroscope system in accordance with the invention is contained within a generally cylindrically shaped inner gimbal or housing 11 that is mounted by trunnions 13 in an outer gimbal (not shown). A high speed motor 15, typically a low friction DC motor, has its stator fixedly secured within the top of the housing 11. A gyroscope rotor 17 is carried for high speed rotation by a shaft 19 extending downward from the motor armature. The upper portion of the gyroscope rotor 17 is hollow, as shown in FIG. 1, and surrounds the lower portion of the motor 15 which extends into the hollow interior of the housing 11.

In accordance with this invention, a multiple pole permanent magnet 21 is secured to the bottom of the gyroscope rotor 17. As shown in FIG. 2, the magnet 21 has four pole pieces 23 symmetrically arranged to extend outward from a central circular opening 25, and is mounted with the opening 25 concentric with the shaft 19 so that the faces at the tips of the pole pieces 23 rotate with the gyroscope rotor 17 to describe a common circular path. An annular sleeve 27 of low remanence magnetic material, such as soft iron, is mounted at the bottom of the gyro rotor 17 to extend downwardly past the tips of the rotating pole pieces 23 to provide a low reluctance path between the pole faces of opposite magnetic polarity. The vertical sides of a circular hollow cup-shaped container 29 made of an electrically conductive, lightweight metallic material, preferably aluminum, extend vertically upward into the space between the rotating pole tips 23 and the magnetic sleeve 27. The cup-shaped container 27 is journalled for rotation about its center axis by a shaft 31 rotatably held in a bearing 32 at the bottom of the housing 11.

Referring now in particular to FIGS. 1 and 4, the drag member preferably comprises a damping disk 33 attached to the end of the shaft 31 for rotation with the container 29 within a surrounding cylindrical sleeve 35 formed at the bottom of the housing 11. A very thin annular space is provided between the peripheral vertical surface of the disk 33 and the inner vertical surface of the cylindrical sleeve 35, which space is filled with a high viscosity damping fluid 37 that is held between the two surfaces by capillary action. As the disk 33 rotates relative to the stationary cylindrical sleeve 35, a fluid shearing action results in the thin layer of high viscosity dampiny fluid 37 between the two surfaces to produce a force tending to restrain the rotation of the container 29. By proper choice of the high viscosity damping fluid and the size of the annular space between the two surfaces, the speed of rotation of the container 29 is limited to only a very small proportion of the gyro rotor spin rate, preferably approximately seven r.p.m. Generally, the container 29 is rotated at slower speeds in this embodiment since the ball 43 moves slowly through the low or medium viscosity damping fluid in the container 29.

The cup-shaped container 29 has an interior ball carrying surface 41 which preferably is made as flat as possible for maximum sensitivity, but which in some cases may have a slight concave curve to reduce sensitivity or to achieve certain pendulosity or other effects, as desired. One or more seismic balls 43, typically of non-magnetic stainless steel or brass, are disposed within the container 29 for free rolling movement on the ball carrying surface 41. The periphery of the container is divided into a number of separate ball carrying compartments by equally spaced detaining members 45. In the preferred embodiment, the detaining members 45 are vertical partitions extending downward from the ends of a series of raised vertical spokes 47 that radiate from a central common juncture to form a unitary structure that can be inserted and removed with ease from the container. The spacing between each of the detaining members 45 is made slightly larger than the diameter of the seismic ball 43, and the spokes 47 are raised above the ball carrying surface 41 by slightly more than the diameter of the seismic balls 43 to permit the free rolling movement of the ball or balls underneath.

In operation, the gyro rotor 17 rotates at high speed in the counterclockwise direction shown by the arrow 51 in FIG. 2 as viewed from above. The magnetic field existing between the ends of adjacent ball pieces 23 of opposite magnetic polarity passes through the conductive sides of the container 29 into the low remnant magnetic material of the annular sleeve 27, which is rotated at high speed with the gyro rotor 17. Rotation of the magnetic member 25 and its magnetic sleeve 27 relative to the container 29 creates a changing flux in the conductive material of the container sides, which by Lenz's law produces eddy currents that set up an opposing magnetic field. The magnetic attraction force between the rotating magnetic poles 23 and the eddy current magnetic field induced in the sides of the container 29 tends to rotate the container 29 in the counterclockwise direction. However, the drag member serves to limit the speed of rotation of the container 29 since the viscous damping fluid 37 retards the movement of these submerged vanes 39. In aircraft instrumentation systems, the gyroscope rotor 17 is typically spun at speeds of 10,000 to 12,000 r.p.m., whereas the rotational speed of the container 29 is preferably limited to approximately five to ten r.p.m.

Referring now to FIG. 3, the arrows 53 and the dashed outlines of the ball 43 illustrate the path of movement of the ball 43 within the container 41 when the gyroscope axis is tilted in a direction toward the bottom of the sheet as viewed in the drawings so that the low point on the ball carrying surface is at L and the high point is at H. As indicated, when the ball 43 is free of the detaining members 45, it rolls downward toward the low point of the tilted ball carrying surface 41. When it reaches the lower periphery, it is engaged by one of the detaining members 45 to be retained within the peripheral compartment between adjacent detaining members 45 and transported toward the high point H by rotation of the containers 29. Upon reaching a given point, the ball 43 rolls free of the detaining member and rolls down the inclined surface 41 back toward the low point. The ball 43 is then engaged again by a detaining member 45 at the lower point and is again transported upwards to the higher point through the arc of rotation. Thus, tilting of the ball carrying surface 41 causes the ball 43 to circulate in a predetermined path displaced to one side of the gyro axis. The mass of the ball produces a torque, the average value of which acts in quadrature relation to the direction of tilt to erect the gyroscope axis on a substantially direct path in erecting the gyro to correct the tilt. On the other hand, when the gyroscope axis is not tilted from its desired alignment with the vertical so that the ball carrying suface 41 is level, the ball 43 remains between a single pair of detaining members 45 throughout the entire revolution of the container 29. The weight of the ball 43 is thus equally distributed in all quadrants during each complete revolution of the container so that there is no net torque in any direction.

Although only a single seismic ball 43 has been illustrated, it will be recognized by those skilled in the art that a plurality of such balls may be employed to increase the available erecting torque or to have a smoothing effect upon the torque supplied to the gyro. The number of balls employed should not exceed the total number of balls that can be retained within the peripheral compartments by the detaining members plus the number of balls that may be in rolling motion from the higher to the lower point under conditions of maximum tilt.

Previously, ball-type erection systems have been considered unsuitable for use in aircraft instrumentation systems subject to severe vibrational stresses, such as encountered in helicopters. Strong vibrations disrupt the regular path of movement of seismic balls within the rotating container making it difficult to obtain the desired quadrature erecting torque. For example, vibrations would tend to dislodge the balls 43 from the peripheral compartments between the detaining members 45 before completion of the desired arc of travel. Attempts made to isolate such ball-type erection systems from the surrounding vibrational environment have largely been unsuccessful.

Referring now to FIG. 5, an alternative embodiment of the invention is shown for use in vibrational environments. In this arrangement, a flexible cover member 55 is disposed within the container 29 above the detaining members 45 to form a fluid-tight enclosure above the ball carrying surface 41. This enclosure is filled to capacity with a light or medium viscosity damping fluid 57 in which the ball 43 is totally immersed. As shown, the flexible cover member 55 is preferably a flexible metal diaphragm soldered in position around its periphery to the interior surfaces of the container 29. The flexibility of this diaphragm allows for thermal expansion and contraction of the fluid 57 contained beneath, while excluding the presence of gases. In operation, the viscosity of the damping fluid 57 prevents rapid movements of the ball 43 over the ball carrying surface 41. The viscosity of the damping fluid 57 thus effectively prevents the ball 43 from being dislodged from the peripheral compartments between the detaining members 45 by vibrational forces before the ball has been carried through the desired arc of travel from low point to high point, and thus the quadrature relationship between the applied torque and the direction of tilt is maintained.

Although both preferred embodiments have been illustrated with the gyro spin axis coincident with the central axis of the container 29, to maintain the gyro spin axis vertical, it should be understood that erection systems in accordance with this invention may be employed to provide other predetermined angular alignments of the gyro spin axis to the vertical. This is accomplished for small angular displacements from the vertical by merely inclining the container 29 the desired amount relative to the gyro spin axis. For larger angles, a separate rotatable conductive cylinder may be disposed adjacent the rotational path of the magnetic poles 23 to be coupled at one edge as by gear teeth to rotate the ball container 29.

While preferred embodiments of the present invention have been illustrated and described herein in order to explain the nature of the invention, it should be understood that various changes, modifications and equivalent arrangements, other than those specifically mentioned herein, may be employed by those skilled in the art without departing from the spirit or scope of the invention as expressed in the appended claims.

What is claimed is:

1. An erecting mechanism for positioning the spin axis of a gyro rotor with a predetermined alignment to the vertical comprising:
   magnet means including a plurality of magnetic pole pieces mounted for rotation with the gyro rotor about its spin axis;
   container means rotatably mounted adjacent said magnetic means with its axis of rotation having said predetermined alignment relative to the spin axis of said gyro rotor, said container means including a metallic cylinder disposed closely adjacent the rotational path of said plurality of magnetic pole pieces and a ball carrying surface disposed normal to the axis of said cylinder;
   at least one ball within said container free to roll on said ball carrying surface;
   a plurality of detaining members spaced about the periphery of said ball carrying surface for engaging each ball at a low point and transporting it to a high point when said ball carrying surface is tilted from the horizontal; and
   means providing a drag force for resisting the rotation of said container means to limit the rotational speed of said container means to a speed much lower than the speed of said gyro rotor.

2. The erecting mechanism of claim 1 wherein: said rotation resisting means comprises a volume of viscous damping fluid and means mounted for rotation in said viscous damping fluid.

3. The erecting mechanism of claim 2 wherein: said rotational resistance means includes a stationary hollow cylindrical member, a disk member mounted for rotation with said container means within said hollow cylindrical member and having an outer cross-sectional configuration slightly smaller than the inner cross-sectional configuration of said hollow cylindrical member to define a narrow annular space between abutting surfaces, and a viscous damping fluid filling said annular space so that rotation of said disk member produces a liquid shear force to resist the rotation of said cylinder.

4. The erecting mechanism of claim 1 further comprising: a volume of damping fluid confined within said container means to immerse said ball and provide fluid drag on the free rolling movement of said ball on the ball carrying surface.

5. A gyro erection mechanism comprising:
   a gyroscope assembly including a mounting means and a gyroscope rotor mounted for high speed rotation on said mounting means;
   magnet means carried by said gyro rotor for high speed rotation therewith;
   a metallic member rotatably mounted on said mounting means, said magnet means being disposed to rotate adjacent said metallic member for urging the rotation of said metallic member by the generation of eddy currents therein;
   a ball carrying surface attached to said metallic member for rotation therewith;
   at least one ball disposed for free rolling movement on said ball carrying surface;
   a plurality of detaining members spaced about the periphery of said ball carrying surface for engaging the ball when it approaches the periphery and for transporting it from a low point to a high point when said ball carrying surface is tilted from the horizontal; and
   means for limiting the rotational speed of said ball carrying surface to a low speed that is a small proportion of the high rotational speed of said gyro rotor.

6. The erection mechanism of claim 5 further comprising:
   an enclosure including said ball carrying surface; and
   a volume of fluid filling said enclosure to immerse said ball for damping the movement of said ball on said ball carrying surface.

7. The erection mechanism of claim 5 wherein: said means for limiting the rotational speed of said ball carrying surface includes a disk member mounted for rotation with said ball carrying surface, a stationary hollow cylindrical sleeve surrounding said disk member and having a diameter slightly larger than the diameter of said disk member to define a narrow annular space, and a viscous fluid filling said annular space, whereby the rotation of said disc member is resisted by a liquid shearing force in said viscous fluid.

8. An erecting mechanism for positioning the spin axis of the gyro rotor with a predetermined alignment to the vertical comprising:
- a container defining a ball carrying surface having a fixed alignment with the spin axis of the gyro rotor;
- a seismic ball member disposed within said container for free rolling movement on said ball carrying surface; and
- a volume of damping fluid confined within the container to immerse said seismic ball and provide a fluid drag on the free rolling movement of said ball on said ball carrying surface.

9. The erecting mechanism of claim 8 wherein: said container is rotatably mounted for rotation with said gyro rotor at a much slower speed and includes a plurality of detaining members spaced about the periphery of the ball carrying surface for engaging the ball at a low point and transporting it to a high point when said ball carrying surface is tilted from the horizontal.

References Cited

UNITED STATES PATENTS

| | | | |
|---|---|---|---|
| 2,556,097 | 6/1951 | Mead | 74—5.44 |
| 2,603,095 | 7/1952 | Barkalow | 74—5.44 |
| 2,902,612 | 9/1959 | Whearley | 310—105 |

LLOYD L. KING, Primary Examiner

WILLIAM E. WAYNER, Assistant Examiner

U.S. Cl. X.R.

74—5.46